(12) United States Patent
Babcock et al.

(10) Patent No.: US 9,750,196 B2
(45) Date of Patent: Sep. 5, 2017

(54) MYCELIAL MASS WITH NON-ELECTRICAL CARBON DIOXIDE TRANSFER

(76) Inventors: Glen Babcock, Missoula, MT (US); Wendy Babcock Garrett, Missoula, MT (US)

( * ) Notice: Subject to any disclaimer, the term of this patent is extended or adjusted under 35 U.S.C. 154(b) by 341 days.

(21) Appl. No.: 13/032,324

(22) Filed: Feb. 22, 2011

(65) Prior Publication Data
US 2015/0250103 A1    Sep. 10, 2015

Related U.S. Application Data

(60) Provisional application No. 61/306,269, filed on Feb. 19, 2010.

(51) Int. Cl.
*A01G 1/04* (2006.01)

(52) U.S. Cl.
CPC .................... *A01G 1/046* (2013.01)

(58) Field of Classification Search
None
See application file for complete search history.

(56) References Cited

U.S. PATENT DOCUMENTS

| | | |
|---|---|---|
| 3,577,678 A | 5/1971 | Burton |
| 3,673,733 A | 7/1972 | Allen |
| 3,810,327 A | 5/1974 | Giansante |
| 4,063,383 A | 12/1977 | Green |
| 4,182,656 A | 1/1980 | Ahnell et al. |
| 4,543,744 A | 10/1985 | Royster |
| 4,639,422 A | 1/1987 | Geimer et al. |
| 4,776,872 A | 10/1988 | Mulleavy et al. |
| 4,963,353 A | 10/1990 | Sidhu |
| 4,969,288 A | 11/1990 | Mori et al. |
| 5,036,618 A | 8/1991 | Mori et al. |

(Continued)

FOREIGN PATENT DOCUMENTS

WO    8803360 A1    5/1988

OTHER PUBLICATIONS

Stamets et al., Growing Gourmet and Medicinal Mushrooms, 3rd ed., p. 1-15, 85-96, 145-166, 179-196, 467-480, 2000.*

(Continued)

*Primary Examiner* — Karen Cochrane Carlson
*Assistant Examiner* — Jennifer M. H. Tichy
(74) *Attorney, Agent, or Firm* — Sarah J. Rhoades

(57) ABSTRACT

Carbon dioxide benefits plants in restricted indoor growing areas. Plants will deplete carbon dioxide levels in an indoor environment over time. The present invention provides a process design, system, and apparatus for a controlled, non-electrical, non-heat generating, non-mechanical, production source of $CO_2$. The source of $CO_2$ is fungi inoculated into a scientifically sterilized, enclosed growth medium prepared in a laboratory setting. The fungi is provided with an optimum food source from which the fungi may produce $CO_2$ for at least six months. The $CO_2$ produced is passively transferred from the fungi growing environment to an indoor plant growing environment under the optimization of the present invention. The transfer is non-electrical and preferably occurs through a gaseous interchange portal system which provides an interface between the fungi's enclosed plastic bag and the surrounding plant-growing environment.

32 Claims, 8 Drawing Sheets

(56) References Cited

U.S. PATENT DOCUMENTS

| | | | |
|---|---|---|---|
| 5,230,430 A * | 7/1993 | Kidder | 206/484.1 |
| 6,358,731 B1 * | 3/2002 | Hsu | C12M 23/14 |
| | | | 435/297.1 |
| 6,490,824 B1 | 12/2002 | Maekawa et al. | |
| 6,705,043 B1 | 3/2004 | Opdam et al. | |
| 6,748,696 B1 | 6/2004 | Davidson | |
| 2002/0184820 A1 | 12/2002 | Mauney | |
| 2004/0065006 A1 | 4/2004 | Weder | |
| 2005/0097815 A1 | 5/2005 | Wasser et al. | |
| 2008/0216397 A1 * | 9/2008 | Busby et al. | 47/1.1 |

OTHER PUBLICATIONS

"The cultivated mushroom . . . ", Bureau of Mushroom Industry, Chicago, p. 14, 16, 17, 1916.*

Walter et al. (International Biodeterioration & Biodegradation, vol. 56, No. 1, p. 51-57, 2005).*

* cited by examiner

MYCELIAL MASS WITH NON-ELECTRICAL CARBON DIOXIDE TRANSFER

CROSS-REFERENCE TO RELATED APPLICATIONS

This patent application claims priority under 35 U.S.C. §119(e) to U.S. Patent Application Ser. No. 61/306,269, entitled "Mycelial Mass with Non-electrical Carbon Dioxide Transfer" and filed on Feb. 19, 2010, which application is now pending. The entire disclosure of that provisional patent application is hereby incorporated by reference.

BACKGROUND

1. Field of Invention

This invention relates to the cultivation of mycelium and more particularly to a process and use of such cultivation of mycelium to produce carbon dioxide with a non-electrical apparatus in order to benefit indoor gardening and similar human activities.

2. Description of Related Art

Carbon dioxide ($CO_2$) is one of the most abundant gasses in the atmosphere. Carbon dioxide plays an important part in vital plant and animal processes, such as photosynthesis and respiration. During photosynthesis green plants convert carbon dioxide and water into food compounds, such as glucose and oxygen. This process, also called carbon assimilation, has the following chemical reaction:

$$6CO_2 + 6H_2O \rightarrow C_6H_{12}O_6 + 6O_2.$$

Humans, animals and fungi, in turn, convert food compounds by combining food with oxygen to release carbon dioxide as well as energy for growth and other life activities. This is the respiration process, the reverse of photosynthesis, and has the following chemical reaction:

$$C_6H_{12}O_6 + 6O_2 \rightarrow 6CO_2 + 6H_2O.$$

Fungi, commonly known as mushrooms, and their saprobe relatives perform a vital function in the availability of carbon dioxide and other elements in these processes. As is evident in each reaction, plants and animals use carbon in their respective life and energy cycles. Plants develop through photosynthesis, a process wherein plants use energy from the sun and carbon dioxide to produce carbohydrates, especially cellulose. Animals consume carbohydrates. The waste and non-living organic bodies resulting from these processes are decomposed by the fungi saprobes. These saprobes get energy and nourishment by biochemical decomposition processes, digesting dead or decaying organic matter in the soil. The fungi excrete digestive enzymes and other chemicals directly onto a food source, which induces the matter to break down for consumption by the organism. The fungi then absorb the consumable products.

Some fungi utilize aerobic respiration, which as shown above, is the breakdown of carbohydrates with oxygen into carbon dioxide and water. Others use various anaerobic processes that do not require oxygen, but these processes produce much less energy. Actually, most fungi are capable of doing either, depending on the soil conditions.

The benefits of carbon dioxide supplementation on plant growth and production within the greenhouse environment have been well understood for many years. As discussed, carbon dioxide is an essential component of photosynthesis. Growers regard $CO_2$ as a nutrient. The sugars produced by plants during photosynthesis are then used for growth within the plant, through respiration. The difference between the rate of photosynthesis and the rate of respiration is the basis for dry-matter accumulation (growth) in the plant. In greenhouse production the aim of all growers is to increase dry-matter content and economically optimize crop yield. With increased levels of carbon dioxide, plant growth can be increased and yields may be increased. $CO_2$ increases plant productivity through improved plant growth and vigor. Tangible results of the productivity increased by $CO_2$ supplementation include earlier flowering, higher fruit yields, reduced bud abortion in roses, improved stem strength and flower size.

Growers have attempted to boost $CO_2$ available to indoor growing environments from many varied sources. In the past, carbon dioxide has been supplied to indoor production facilities, indoor growing environments, or greenhouses by using specialized $CO_2$ generators to burn carbon-based fuels such as natural gas, propane, and kerosene, or directly piping it from tanks of pure $CO_2$. These sources have had disadvantages including: high costs of production, increased temperature or moisture in localized areas and to particular plants, disease or contamination such as may occur from incomplete combustion or the presence of foreign chemicals or byproducts. Due to these and other disadvantages, prior inventions have proposed that fossil fuels should no longer be used for indoor gardening.

Even with the goal to cease use of fossil fuels, problems persist with $CO_2$ production methods currently in use. Of course, utilizing fossil fuels is a wasteful process when producing $CO_2$. But with the increasing focus on becoming more "green" and decreasing costs, the continuous use of electricity must be avoided. Use and reuse must be prioritized. Initial set-up and maintenance costs must be reduced. Prior inventions have mandated the use of an electrical mechanism or an electrically activated pump to move the $CO_2$. The ongoing use of electricity and permanent parts such as pumps do not sufficiently decrease the cost of operation for the $CO_2$ production systems. Such systems also need refills and do not provide a recyclable source of $CO_2$. Because those $CO_2$ production methods require the use of continuous electricity, they are not environmentally friendly. Furthermore, increased energy prices make all of these prior $CO_2$ production systems undesirable. A need exists for a method of boosting $CO_2$ production in indoor growing spaces without requiring additional, artificial energy inputs.

BRIEF SUMMARY OF THE INVENTION

The present invention provides a means to create an ideal growing environment for a carbon dioxide producing saprobe or fungi and meanwhile provides a non-electrical transfer interface between the fungi growing environment and an indoor plant growing environment. The system, process, and apparatus invention further comprises steps and means for:

producing a pure fungi strain in a petri plate from a tissue culture;

producing a pure spawn culture from the petri plate strain;

combining the spawn strain with sterile water and nutrient additives in a sterile vessel; incubating the combination;

placing a blend of a cellulose-based substrate, such as but not limited to sawdust, nutrient additives, and water in a container with at least one $CO_2$ portal or vent, preferably a polypropylene bag with at least one vent;

removing the combination from the sterile vessel and forming a mycelial mass by mixing the combination with the cellulose-based substrate in the container;

sealing the opening of the bag containing the mycelial mass such as by a heat seal;

incubating the mycelial mass mixture in the bag for a period of time to create an ideal growing environment for the mycelium; and placing the bag of mycelial mass in an indoor plant growing environment to affect a non-electrical production and transfer of $CO_2$ through an interface with indoor plant growing environment.

The increased $CO_2$ production enhances plant growth in the indoor growing environment.

The process of making the invention utilizes laboratory skills and pure, sterile mycelium culture. This invention is designed to produce $CO_2$ for use in an indoor gardening or greenhouse operation. It is non-electrical with no moving parts or components. It has been known that $CO_2$ is beneficial for plant growth and with added $CO_2$ plants will grow to be larger, more robust and have increased yields. As described, most prior $CO_2$ production systems were based on the burning of fossil fuels. This is not only a wasteful process, but it is unnecessary. The use of the present mycelial mass to produce $CO_2$ is an improvement over existing methods. Some systems utilize fungi as part of their production process but also require electrical components as well. The ongoing use of electricity is also a wasteful process and is unnecessary. The present invention combines ideal components to provide an optimal solution. The mycelial mass spawned from the preferred strain of mycelium will produce $CO_2$ for up to 6 months without any undesirable effects. A one-time cost is incurred at start-up. There is no need for refills or adjustments. After 6 months the container can be recycled as plastic and the mycelial mass can either be mixed into a compost pile or spread out as a soil amendment.

No end-user, human action is required with the exception of placing the mycelial mass bag in a location where $CO_2$ is needed. To utilize the benefits of the $CO_2$ transfer, the bag should be placed in an indoor growing area and placed above the height of the plants. Because the $CO_2$ molecule is heavier than atmospheric molecules, including $O_2$, they will precipitate downward toward the plants. The use of a mycelial mass in a bag allows $CO_2$ to be released without the need for any electrical dispersal method. The result is a heat-free optimization and utilization of saprobe-produced carbon dioxide. In the preferred embodiment, a Unicorn™ bag or other functional, filter-bag substitute is used as the container. However, it is known that any container with a restricted air flow and filter system will allow the invention to function.

The invention utilizes recycled materials and is itself 100% recyclable. The solution to problems with prior inventions lies in the present invention's process to produce $CO_2$ without the use of fossil fuels or continuous electricity or with any heat byproduct generation. The present invention is inexpensive, requires no refills, and is fully recyclable. The plastic is recycled by known recycling means and the mycelial mass may be composted. The use of a mycelial mass inside a polypropylene bag with a gaseous exchange portal with no need for electricity actuation solves prior problems in the field. By allowing the natural respiration process of mycelium to occur within the vented bag, $CO_2$ is released and can be utilized for enhanced plant growth. Then, when the mycelial mass is exhausted, the entire combination is simply recycled. The system will be particularly beneficial in the temperate or cooler parts of the world where greenhouses are a fundamental part of the gardening experience.

The foregoing has outlined, in general, the various aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the methods, advantages, and objects of the present invention. Each drawing is referenced by corresponding figure reference characters within the "DETAILED DESCRIPTION OF THE INVENTION" section to follow.

DETAILED DESCRIPTION OF THE INVENTION

The present invention generally comprises the processes of creating and using an isolated fungi growing environment inside a larger indoor plant growing environment whereby the invention allows the user to enhance $CO_2$ exposure of the plants in the larger ambient growing area. In order to create an optimum, isolated, and sterile fungi growing environment which will generate and expel $CO_2$ into a plant growing environment, the invention provides an apparatus, system, and process comprising:

starting a fungus tissue culture;
    creating a spawn of the cultured fungus;
    preparing a bulk substrate;
    filling a heat-tolerant bag with the substrate;
    sterilizing the substrate and bag;
    cooling the substrate and bag;
    inoculating the substrate in the bag with spawn to create a mycelial mass;
    sealing the bag;
    incubating the bag's mycelial mass; and
    utilizing the mycelial mass and bag to produce a $CO_2$ interface with an indoor plant growing environment.

These steps are set forth below in greater detail. To start the process of mycelial growth a specific strain is introduced to an agar medium to grow from spores or tissue culture. As demonstrated in FIG. 1, the beginning phase of the process is to start a population of fungi from a purified tissue culture. Agar plates with master cultures are prepared by using sterile petri plates that have been filled with Potato Dextrose Agar (PDA) and sterilized. The depiction of FIG. 1 begins at the left with a petri plate, a Potato Dextrose Agar, water, and a tissue culture of the desired mushroom species. The Potato Dextrose Agar and water are mixed together and placed in the petri plate. These agar plates or master cultures are created by using sterile petri plates that have been filled with PDA and sterilized at 250 degrees Fahrenheit for 1 hour. The agar and plate combinations are sterilized such as by autoclave and allowed to cool.

Figure 1:
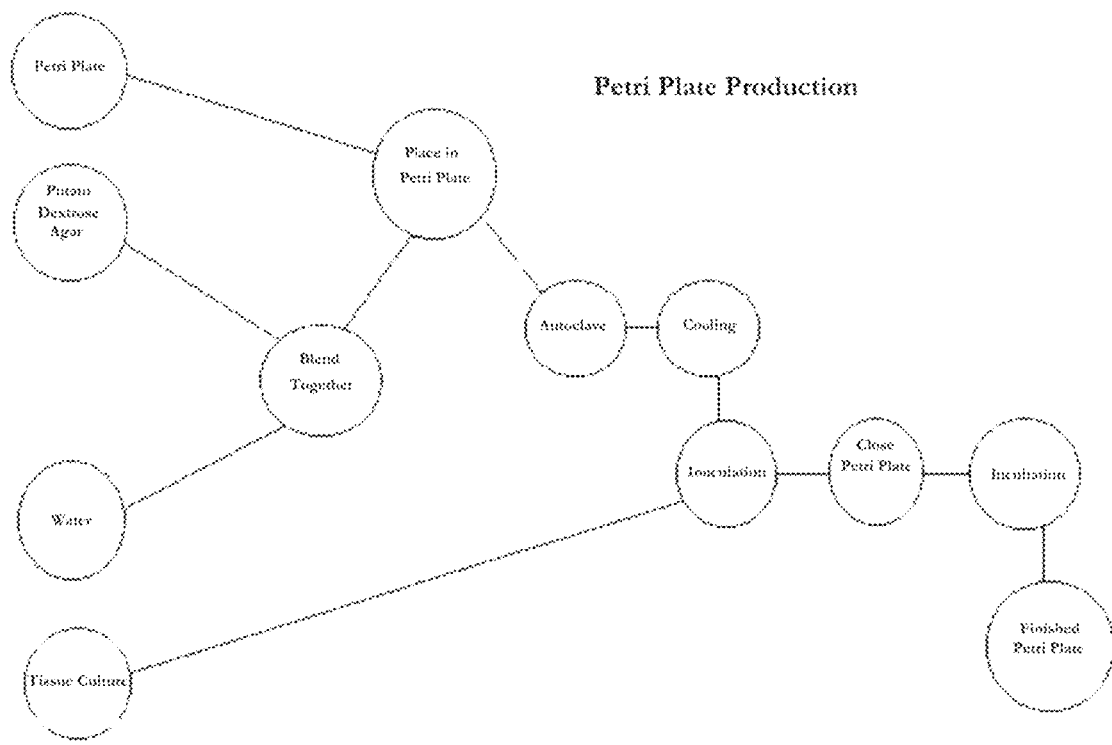
FIG. 1 is a schematic depiction of tissue culture petri plate production including the initial steps of the inventive process which results in a finished petri plate inoculated with a pure fungi strain.

As illustrated in FIG. 1, the cooled plates containing the agar are inoculated with the sterile transfer of spores or tissue by known laboratory procedures and protocols. The preferred protocol calls for first sterilizing the instrument used for the transfer with flame or other sterilizing agent followed by transferring a small amount of spores or tissue into said petri plate and placing spores or tissue so that it comes in contact with agar in petri plate. Once contact is made spores or tissue is left on agar and the instrument is removed and petri plate is covered and sealed. With incubation (at the desired temperature of 70 degrees Fahrenheit), growth of mycelium will be noticeable in 24-72 hours after spore or tissue transfer and will continue until a layer of mycelium covers the entire agar surface.

Figure 2:
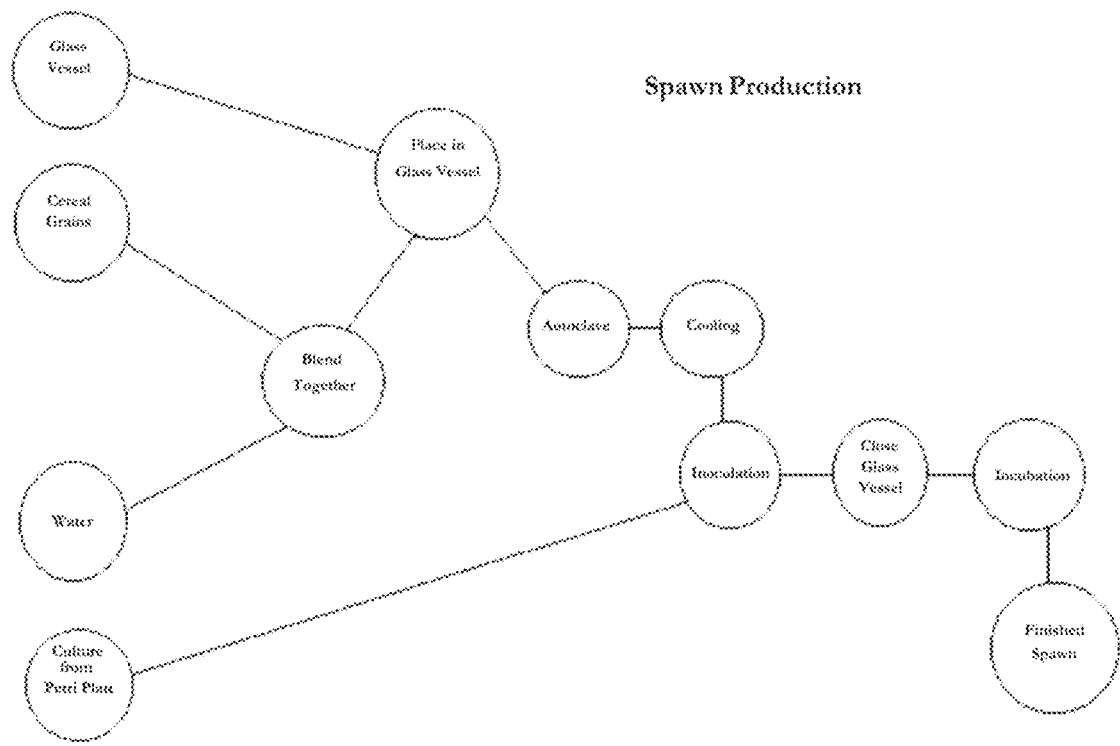
FIG. 2 is a schematic depiction of the spawn production, or those steps taken to spawn the petri plate fungi strain of the present invention.

The diagram in FIG. 2 continues the process and depicts spawn production from the petri plate culture created in FIG. 1. The process begins with a sterile vessel (glass is suggested), nutrient-rich additives, water, and the culture from the petri plate. Ideal nutrient additives may be cereal grains (e.g., oats, rye, milo, or similar grains). The nutrient additives and water are blended together and placed in a sterile vessel for sterilization. The sterilization process should be done with heat and pressure, such as by autoclave, and then allowed to cool. Optimally, the nutrient blend is sterilized at 250 degrees Fahrenheit for at least one hour. The combination is allowed to cool in a HEPA (High Efficiency Particulate Air) filtered chamber. Once cooled to approximately 75 degrees Fahrenheit, the sterile, nutrient rich blend is inoculated with the pure culture which was previously grown on the agar petri plates. The result is the pure culture spawn used in later bulk inoculation (see FIG. 3).

Figure 3:
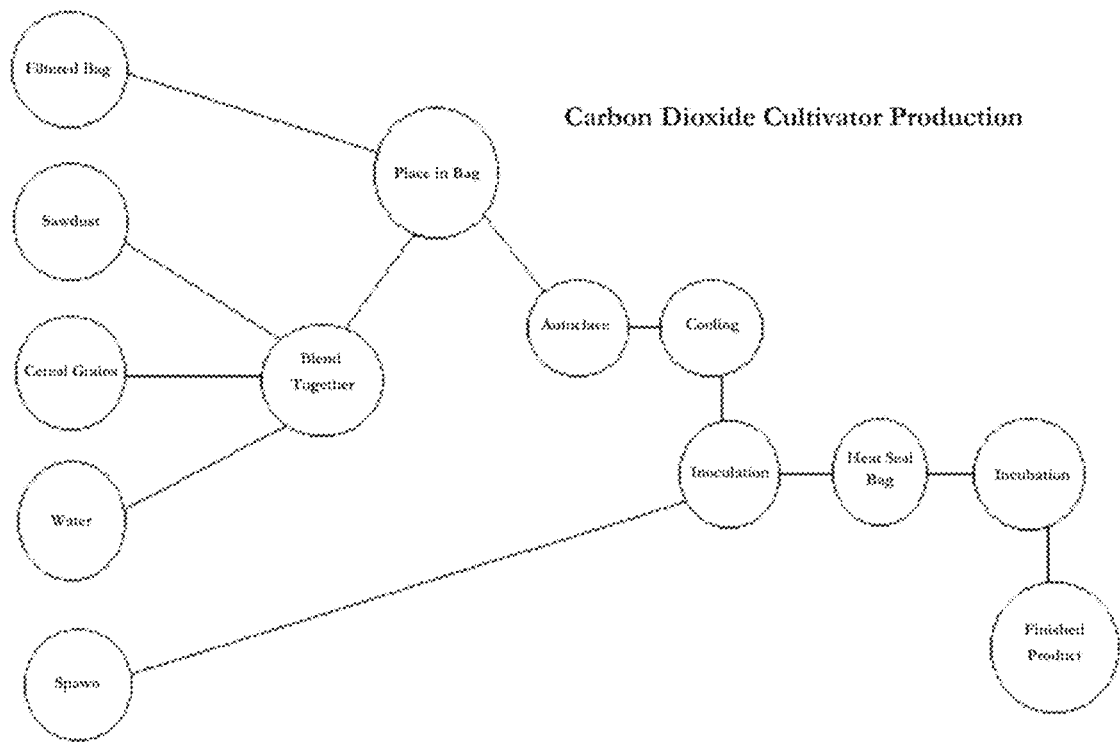
FIG. 3 is a schematic depiction of the carbon dioxide cultivator production or final production steps of inoculating the spawn within a combination of a cellulose-based substrate such as but not limited to a combination of sawdust, nutrient additives, and water.

The bulk substrate of mycelial mass is produced as may be better understood by viewing FIG. 3. To begin, a cellulose-based substrate such as but not limited to sawdust, more nutrient additives such as cereal grains, and water are blended to achieve a substrate with a optimal moisture content of approximately 65%. While this is indicated to be optimal moisture content, it is typical to have ranges between 60%-75%. Other ranges (e.g., about 50%-80%) are known to maintain functionality, but are not ideal. This substrate is placed in a container with a gaseous interchange portal. The container is desirably a autoclave-able bag, preferably having a single air-vent with a microbial filter. After the substrate is placed in the bag, it is autoclaved. The process of sterilizing the bulk substrate involves utilizing steam generated from a steam boiler that is piped into an autoclave and allowed to be put under pressure at a temperature of 250 degrees Fahrenheit. Sterilizing the substrate under these conditions for at least one hour is required. Preferred sterilization time is up to 2 hours. The bag and the substrate are allowed to cool to approximately 75 degrees Fahrenheit or cooler. The cooling of the substrate is a vital step in this process. Cooling must take place in a HEPA filtered room that is positively charged with air. If this is not done the substrate will become contaminated and will not be suitable for inoculation. Once the substrate is properly cooled to approximately 75 degrees Fahrenheit, it is inoculated with pure culture spawn. The bulk substrate is suitable for spawn growth and because the media has been sterilized at every juncture, bacteria, undesired fungi, and other contaminants will be minimized. In the preferred embodiment, bags are filled with substrate—approximately to the halfway point or up to the gaseous interchange portal means. The bag and substrate are inoculated with spawn forming the mycelial mass 1 of the present invention. In the preferred embodiment, the combination weighs approximately 6 pounds.

Figure 4:
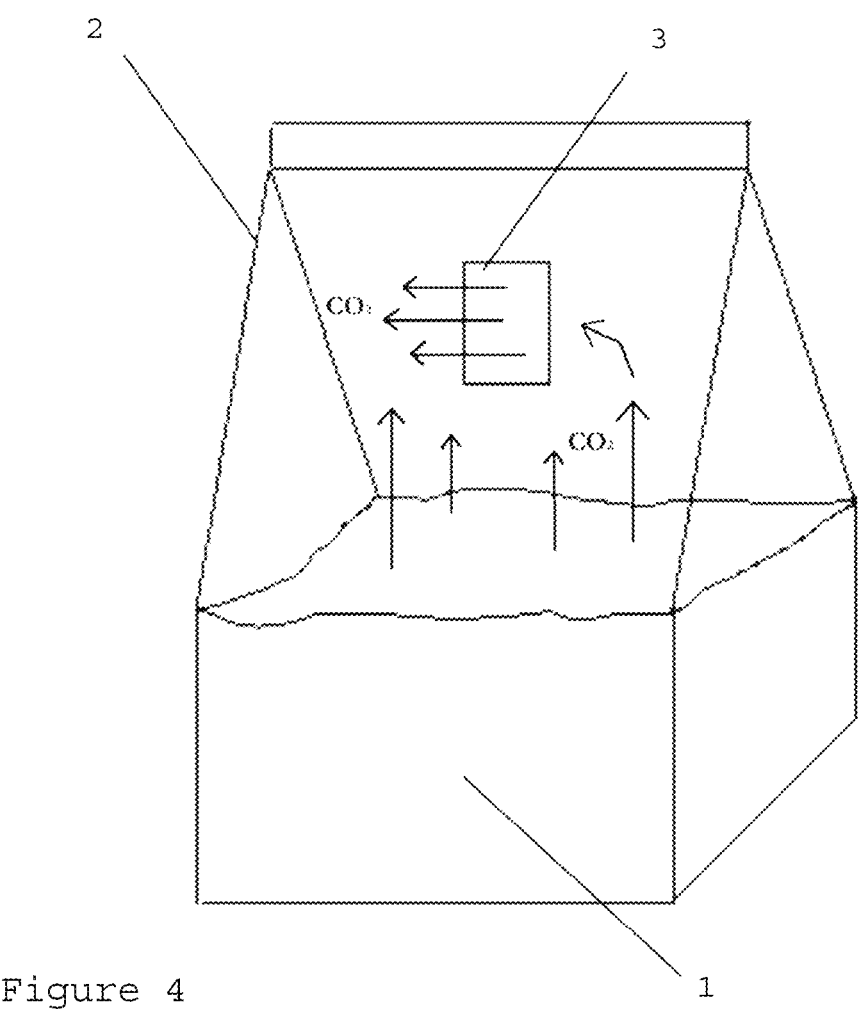
FIG. 4 is a schematic depiction of $CO_2$ production with the finished mycelial mass produced in the steps reflected in FIGS. 1-3 and illustrates the non-mechanical, flow of $CO_2$ produced by the mycelial mass in the polypropylene bag and the $CO_2$ transferring by diffusion or other natural dispersal to the ambient air.

The substrate as inoculated creates the mycelial mass 1, as schematically shown in FIG. 4, inside the transparent or translucent polypropylene bag 2 with a gaseous interchange portal 3. The bag or container 2 may be opaque and still function according to the objectives of this invention. As has been described, the inoculation of the substrate is done by adding pure spawn under sterile conditions. Preferably, about ⅓ of a cup of pure culture spawn will be added from the sterile vessel to each 6 pounds of bagged and sterilized substrate in order to optimize good mycelial growth and available food and nutrient consumption over a six month period. A heat impulse sealer is preferably used to seal the bag. In this case, the seal is approximately 1.5 inches from the top of the bag. However, any air-tight sealing means may be employed. The sealing of the bag closes the sterile environment and the mycelium can produce $CO_2$ using the food in the mycelial mass. The bag should not be opened again except for disposal and recycling. Opening the bag would interrupt the flow of $CO_2$ and could possibly contaminate the mycelial mass. The use of a filter such as the Unicorn™ filter bag or biological breather patch allows the most ideal environment for the mycelial mass to create and transfer $CO_2$ to the surrounding environment.

After sealing the bag containing the mycelial mass, the combination must be incubated. In the preferred method, incubation should occur at a temperature of 70 degrees Fahrenheit for 3-4 days. This allows mycelial growth to begin and to reach the ideal environmental conditions for the proliferation of the mycelial mass. For the preferred species, once mycelial growth is appreciable to the human eye, the product is ready for commercial distribution or use in any environment where increased $CO_2$ is desired. The use of the mycelial mass 4 in the bag 2 is demonstrated in schematic in FIG. 4. The polypropylene bag 2 schematically demonstrated in FIG. 4 contains the substrate inoculated with the spawn and incubated to the prescribed level of production.

In the preferred embodiment, the necessary level of production will have been reached once the preferred fungus (see infra) white rot begins to be visible to the naked human eye. $CO_2$ is constantly being expired or expelled by the saprobes or fungi in the mycelial mass. That $CO_2$ is passed from the interior of the bag to the ambient air surrounding it by natural dispersal by air-exchange chemical processes. Contrary to prior belief, it is not necessary to actuate this expulsion with any agitation or mechanical or electrical means but the transfer will occur naturally to a beneficial level if the growth and containment is controlled according the present invention disclosure.

The present invention begins producing $CO_2$ immediately without further action. The invention is designed to be used to increase levels of $CO_2$ in an indoor gardening setting. Placement in the growing area is important. The mycelial mass bag should be placed above the height of the plants in the growing space. $CO_2$ will precipitate downward in atmospheric air and thus should be placed at a level higher than growing plants.

The bag is preferably made of recycled polypropylene or other plastic which may be further recycled. The bag material must be heat-tolerant for sterilization purposes. The preferred bags should be designed to withstand temperatures up to 250 degrees Fahrenheit. There are a number of different types of vented bags available which have been developed for the purpose of creating an environment suitable for mycelial growth and production. All of these bags are suitable to use for the present invention's process, apparatus, and application. Ideally, the preferred vented bag will contain a microbiological filter that acts as a gaseous interchange portal that will allow gas exchange without allowing contaminants to enter the bags. The use of a vented bag allows $CO_2$ to be released without the need for any other dispersal method or any additional human action of any kind other than placing the bag in a location where an increase of $CO_2$ is desired. In the preferred embodiment, a Unicorn™ bag or the functional filter-bag equivalent is used as the plastic bag container. While this bag is optimal for the purposes of the invention, it is but one bag which will accomplish the objectives of $CO_2$ production of the present invention.

As used herein, spawn is actively growing mycelium. In the present invention, spawn is placed on a growth substrate to seed or introduce mycelia to grow on the substrate. This is also known as inoculation, spawning or adding spawn. The primary advantages of using spawn is the reduction of contamination while giving the mycelia a firm beginning Spores are another inoculation option, but are less developed than established mycelia. Either spores or mycelia used in the present inventive process are only manipulated in laboratory conditions within a laminar flow cabinet. The process of making the present invention utilizes sterile laboratory protocols and pure, sterile mycelial culture.

While all strains of mycelium from the kingdom Fungi including Basidiomycetes and Ascomycetes are suitable for this application, strains that exhibit little or no fruiting characteristics are preferred. When producing $CO_2$ it is desirable to avoid primordial production and to have only mycelial growth occur. This is because primordial formation diminishes $CO_2$ production by fungi. The process disclosed in the present invention will also create an ideal environment for the controlled and non-flowering growth of mycelium.

For the preferred embodiments of this invention, the fungal strain utilized is *Trametes versicolor* which is a white-rot fungus known by the common name, "Turkey Tail." *Trametes versicolor* causes a general delignifying decay of cellulose-based substrates such as but not limited to hardwoods. The appearance of this fungi is whitish in color which may be aesthetically pleasing when the bag is placed for $CO_2$ production. This visual appearance of this strain is helpful during the incubation phase of the process when trying to achieve optimum incubation periods. Furthermore, the *Trametes versicolor* mycelium is very active and aggressive and grows very quickly resulting in good $CO_2$ production. The use of the polypropylene bag and the naturally occurring strain in organic materials make every aspect of the present invention readily recyclable. Furthermore, while pre-consumer materials my be used, the preferred materials are made of previously used and recycled materials.

An analysis of test performed on dry matter of substrate mixtures reveals that recycled materials actually optimize nutrient conditions. The testing parameters incorporated mixtures of new sawdust, recycled sawdust, and a combination of the two. These several substrate mixtures were compared with and without supplement, and without cooking Where used, the supplement comprised a mixture of ingredients known to benefit fungal growth. The data collected assessed percentages of total dry matter, nitrogen, non-detergent fiber, acid detergent fiber, lignin, hemicellulose, insoluble ash, and cellulose. For informational purposes, neutral-detergent fiber (of substrate) is basically cell wall components (cellulose, hemicellulose) of substrate. This indicates something about the fungus's ability to degrade 'structural carbohydrates.' Acid detergent fiber is the lignocellulose component of the substrate which relates to the fungus's ability to degrade lignocellulase with lignocellulytic enzymes. Lignin is a complex chemical compound (non-carbohydrate aromatic polymer) present in wood and is an integral part of the secondary cell walls of plants and some algae. Cellulose is a polysaccharide (complex carbohydrate) that is the main constituent of the cell wall in most plants. Hemicellulose is another polysaccharide but less complex than cellulose and more easily hydrated. Soluble ash is the soluble carbohydrates in the ash portion and reflects the ability of the fungus to solubilize a portion of the ash content (making it into a soluble form). Insoluble ash is the remaining byproduct. The following is data collected from an ANALYSIS OF SUBSTRATE MIXTURES:

Row 1: New Sawdust, no supplement
Row 2: New Sawdust, with supplement
Row 3: Recycled sawdust, no supplement
Row 4: Recycled mix: 60% new sawdust, 40% old sawdust, with supplement 20%

| Row | 100C DM | Total % DM | % N | % NDF | % ADF | % Lignin | % Hemicellulose | % Insol ash | % Cellulose |
|---|---|---|---|---|---|---|---|---|---|
| 1 | 92.63 | 25.96 | 0.299 | 101.48 | 80.12 | 17.31 | 21.36 | 0.94 | 61.87 |
| 2 | 90.56 | 26.45 | 0.927 | 82.90 | 62.49 | 14.17 | 20.41 | 0.84 | 47.48 |

-continued

Row 1: New Sawdust, no supplement
Row 2: New Sawdust, with supplement
Row 3: Recycled sawdust, no supplement
Row 4: Recycled mix: 60% new sawdust, 40% old sawdust, with supplement 20%

| Row | 100C DM | Total % DM | % N | % NDF | % ADF | % Lignin | % Hemicellulose | % Insol ash | % Cellulose |
|---|---|---|---|---|---|---|---|---|---|
| 3 | 92.71 | 52.71 | 2.297 | 51.78 | 37.36 | 6.50 | 14.42 | 6.53 | 24.33 |
| 4 | 93.41 | 31.17 | 1.763 | 56.03 | 39.33 | 7.21 | 16.70 | 4.96 | 27.16 |

DM = Dry matter;
Total % DM = dry matter percent;
% N = percent Nitrogen;
% NDF = percent non-detergent fiber;
% ADF = acid detergent fiber;
% Lignin = percent lignin;
% Hemicellulose = percent Hemicellulose;
% Insol. Ash = percent insoluble ash;
% Cellulose = percent cellulose The data indicates that the Nitrogen percentages are significantly increased with the use of recycled sawdust or a mixture of new and recycled sawdust and further improved with supplementation. The percent of cellulose, lignin, and hemicellulose decreases in the recycled material tests suggest that the fungus has decomposed more of these. White rot fungus strains are known to decompose both lignin and complex carbohydrate compounds like cellulose. Meanwhile the percentage increases of Insoluble Ash are significant for recycled and mixed recycled sawdust versus new sawdust. These results indicate a high nitrogen to carbon ratio and that the decomposition by the fungus is significant; however, all of the parameters measured will depend on the enzymatic ability of the particular fungus involved.

Methods of passive $CO_2$ transfer were previously believed to be insufficient resulting in the prominent use and development in prior inventions of electrical transfer techniques. The initial tests for $CO_2$ transfer by the present invention have been very successful. In particular, the production of $CO_2$ after the inoculation of the spawn and incubation of the mycelial mass has proven to achieve $CO_2$ production levels which can enhance growth of plants. For the majority of greenhouse crops, net photosynthesis increases as $CO_2$ levels increase from 340-1,500 parts per million (ppm). Most crops show that for any given level of photosynthetically active radiation (PAR), increasing the $CO_2$ level to 1,500 ppm will increase the photosynthesis by about 50% over ambient $CO_2$ levels. Ambient $CO_2$ levels in outside air are typically about 340 ppm by volume. All plants grow well at this level but as $CO_2$ levels are raised by 1,000 ppm photosynthesis increases proportionately resulting in more sugars and carbohydrates available for plant growth. Any actively growing crop in a tightly clad greenhouse with little or no ventilation can readily reduce the $CO_2$ level during the day to as low as 200 ppm. Plants cannot thrive under these conditions.

During particular times of the year, in new greenhouses, and especially in double-glazed structures that have reduced air exchange rates, the carbon dioxide levels commonly drop below outside air $CO_2$ levels of 340 ppm. This nutrient deficit has a significant negative effect on the crop. Ventilation during the day can raise the $CO_2$ levels closer to ambient levels, but rarely reach levels equivalent to 340 ppm. Supplementation of $CO_2$ is seen as the only method to overcome this deficiency and increase the level above 340 ppm which is beneficial for most crops. The level to which the $CO_2$ concentration should be raised depends on the crop, light intensity, temperature, ventilation, stage of the crop growth and the economics of the crop. For most crops, the $CO_2$ saturation point will be reached at about 1,300-2,000 ppm under ideal circumstances. Increased $CO_2$ levels will shorten the growing period by 5%-10%, improve crop quality and yield, as well as increase leaf size and leaf thickness. The present invention will allow growers to optimize and utilize desired $CO_2$ levels for their respective crops. The process is an organic system to produce, retain, and non-mechanically siphon carbon dioxide from a mycelium mass to a photosynthesizing plant.

The following tests and corresponding results were measured and tabulated for the present invention. $CO_2$ levels were tested and recorded using a $CO_2$ meter inside sealed vessels for specific periods of time. Increased $CO_2$ levels were demonstrated in each test as demonstrated in FIGS. 5-7.

Figure 5:
FIG. 5 demonstrates the results of Test 1 of a series of carbon dioxide tests where one bag of the present invention was enclosed in a 20 cubic foot sealed vessel for 12 hours and testing occurred at hourly intervals.

FIG. 5 demonstrates the results of Test 1 where one bag was enclosed in a 20 cubic foot sealed vessel with a carbon dioxide meter inside. The tested $CO_2$ level before introducing $CO_2$ was measured at 380 ppm. After 12 hours of monitoring, the $CO_2$ level was 8560 ppm. FIG. 5 specifically shows the individual $CO_2$ levels at hourly intervals beginning at 7 a.m. when the $CO_2$ level was 380 ppm and ending at 7 p.m. with a $CO_2$ level of 8560 ppm. The test results are illustrated in FIG. 5.

Figure 6:
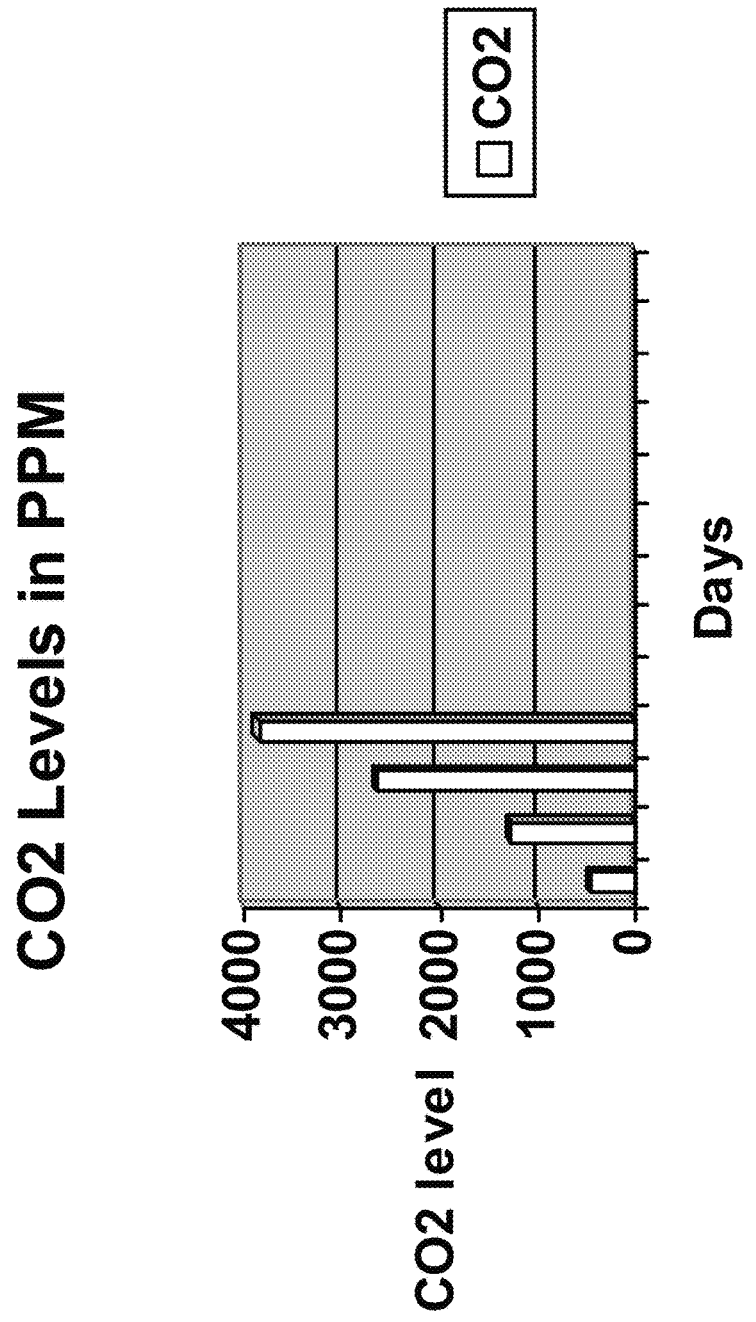
FIG. 6 shows the carbon dioxide testing results of Test 2, when one bag according to the present invention was enclosed in a 100 cubic foot sealed vessel for 72 hours and results were recorded every 24 hours.

FIG. 6 demonstrates the results of Test 2 where one bag was enclosed in a 100 cubic foot sealed vessel with a carbon dioxide meter inside. The tested $CO_2$ level before introducing $CO_2$ was measured at 465 ppm. After 72 hours of monitoring, the $CO_2$ level was 3850 ppm. FIG. 6 specifically shows the individual $CO_2$ levels at 24 hour intervals beginning on December 20, 2009 when the $CO_2$ level was 465 ppm and ending on Dec. 23, 2009 with a $CO_2$ level of 3850 ppm. The test results are illustrated in FIG. 6.

Figure 7:
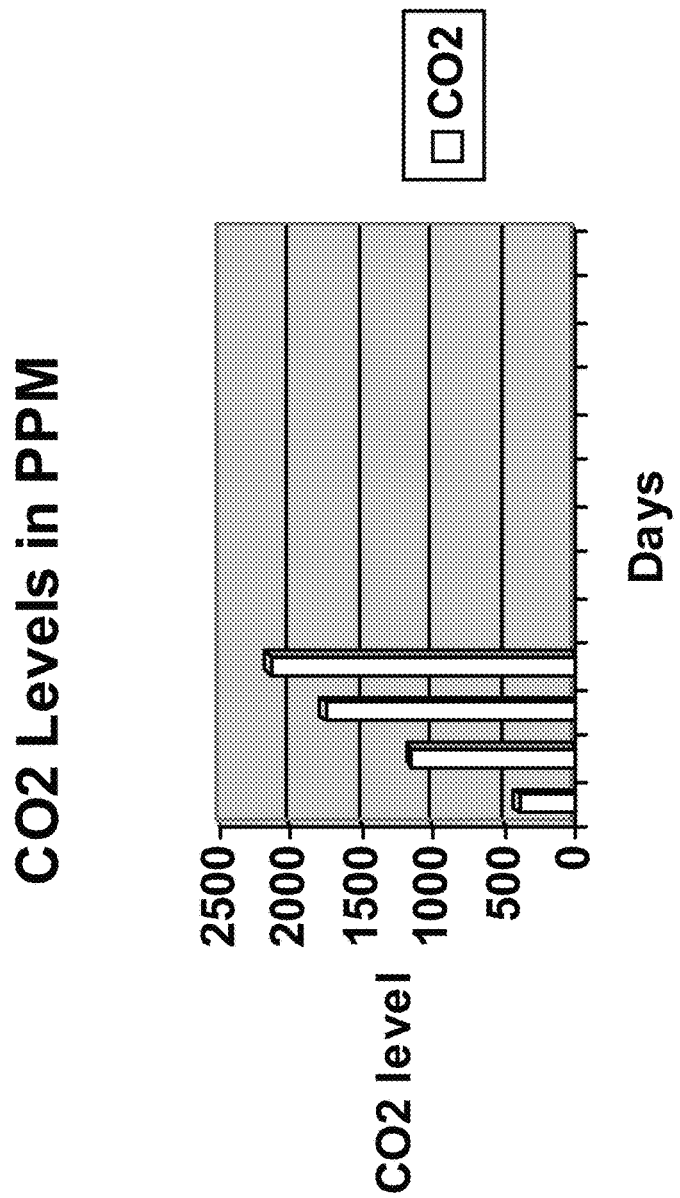
FIG. 7 illustrates the result of Test 3 of the series of carbon dioxide levels tests where a bag according to the present invention was enclosed in a 750 cubic foot sealed room for 72 hours and carbon dioxide levels were recorded at 24 hours intervals.

FIG. 7 demonstrates the results of Test 3 where one bag was enclosed in a 750 cubic foot sealed room with a carbon dioxide meter inside. The tested $CO_2$ level before introducing $CO_2$ was measured at 405 ppm. After 72 hours of monitoring, the $CO_2$ level was 2150 ppm. FIG. 7 specifically shows the individual $CO_2$ levels at 24 hour intervals beginning on Jan. 20, 2010 when the $CO_2$ level was 405 ppm and ending on Jan. 23, 2010 with a $CO_2$ level of 2150 ppm. The test results are illustrated in FIG. 6.

Sterilization of materials described herein is preferably done utilizing an autoclave or as it is also known, a retort. Autoclaving is the most effective and most efficient means of sterilization. All autoclaves operate on a time/temperature relationship. These two variables are extremely important. Sterilization with steam heat under pressure is used. As steam enters the autoclave chamber the air temperature rises in the chamber. It rises more quickly than the substrate temperature because the substrate has density. The steam pressure also begins to rise and after 7 hours the air temperature and the substrate temperature equalize at 250 degrees Fahrenheit or 15 pounds per square inch (psi). At this point, sterilization begins and is allowed to continue for 2 hours. One hour at 250 degrees Fahrenheit or 15 psi is sufficient, but allowing for 2 hours of sterilization is a preferred in order to ensure sterility.

Figure 8:
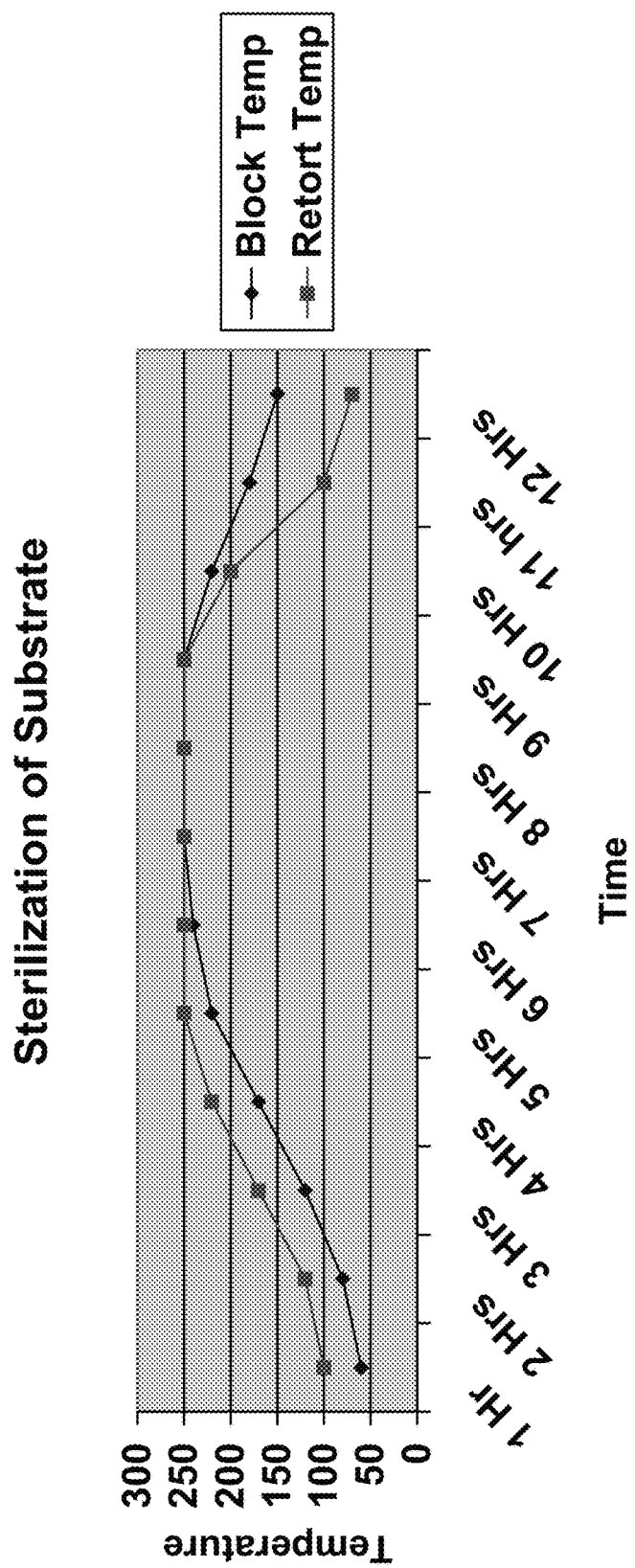
FIG. 8 is a line graph illustrating the respective Block and Retort temperatures reached in optimum sterilization techniques used for the present invention.

As can be seen in the following table, after 9 hours the steam pressure inside the autoclave is reduced back down to atmospheric pressure (0 psi), which equates to 212 degrees Fahrenheit. Optimum sterilization of the substrate according to the present invention is demonstrated in FIG. 8.

The substrate retains heat longer than the air inside the autoclave. This causes the bag in which the substrate is enclosed to draw in air from the vessel in an attempt to equalize the pressure inside the bag to be equal to the pressure inside the autoclave. The air that is drawn into the bag must be HEPA filtered, sterile air. Without the use of HEPA filtration the substrate could become contaminated with airborne spores or other airborne contaminants. Once substrate bags have cooled to at least 80 degrees Fahrenheit the inoculation process can begin.

It is further intended that any other variations and embodiments of the present invention which result from any changes in application or method of use or operation, method of manufacture, shape, size, or material which are not specified within the detailed written description or illustrations contained herein, yet are considered apparent or obvious to one skilled in the art, are within the scope of the present invention.

We claim:

1. A plant-growth enhancement apparatus comprising:
   a mycelial mass comprised of mycelia, nutrients, and a cellulose-based substrate blend, the mycelia comprising *Trametes versicolor* (Turkey Tail),
   a container having at least one opening and at least one gaseous interchange portal, the mycelial mass disposed within the container,
     wherein the mycelial mass is prepared from a culture of a pure fungal strain of *Trametes versicolor*, the culture added to a sterilized water and nutrient mixture to form a combination, the combination further mixed into the container with the cellulose-based substrate blend,
   the at least one opening of the container with the mycelial mass is closed by a seal,
   the plant-growth enhancement apparatus optimizes generation of carbon dioxide and passively distributes carbon dioxide from an elevation above plants in an indoor growing environment.

2. The apparatus of claim 1 where the apparatus is recyclable by composting the mycelial mass and recycling the container.

3. The apparatus of claim 1 wherein the at least one gaseous interchange portal further comprises a microbial filter.

4. The apparatus of claim 1 wherein the at least one gaseous interchange portal comprises a biological filtered vent.

5. The apparatus of claim 1 wherein the cellulose-based substrate comprises recycled sawdust.

6. The apparatus of claim 1 wherein the sterilized water and nutrient mixture is treated by a combination of heat and pressure.

7. The apparatus of claim 1 wherein the nutrients comprise cereal grain.

8. The apparatus of claim 1 wherein the container comprises a heat tolerant bag.

9. The apparatus of claim 8 wherein the container comprises a polypropylene bag.

10. A plant-growth improvement apparatus comprising:
    mycelial mass,
    a container with an opening and a gaseous exchange portal,
    wherein the mycelial mass is further comprised of:
      mycelia comprising *Trametes versicolor* (Turkey Tail),
      a water and nutrient mixture, and
      a blend of cellulose-based substrate,
    the mycelial mass disposed in the container; and
    whereafter the apparatus affects the optimal generation and passive distribution of carbon dioxide to a plant-growth environment via a non-electrical transfer of carbon dioxide to plants from an elevation above the plants.

11. The apparatus of claim 10, wherein the mycelial mass is formed by steps comprising the following:
    selecting a pure strain of *Trametes versicolor*;
    growing a pure spawn culture from the pure strain of *Trametes versicolor*;
    mixing water and nutrient additives to create the water and nutrient mixture;
    sterilizing the water and nutrient mixture;
    combining the pure spawn culture with the water and nutrient mixture in a sterile vessel to form a combination;
    incubating the combination in the sterile vessel.

12. The apparatus of claim 10, wherein the blend of cellulose-based substrate is formed by steps comprising the following:
    placing the blend of cellulose-based substrate in the container, sterilizing the blend of cellulose-based substrate in the container; and
    cooling the blend of cellulose-based substrate in the container in a HEPA chamber;
    adding the mycelia and the water and nutrient mixture to the container while in the HEPA chamber.

13. The apparatus of claim 10, wherein the container filled with the mycelial mass is sealed at the opening.

14. The apparatus of claim 10, wherein the container filled with the mycelial mass is incubated for a period of time.

15. The apparatus of claim 10, wherein the blend of cellulose-based substrate comprises recycled sawdust.

16. The apparatus of claim 10, wherein the container comprises a heat tolerant bag.

17. The apparatus of claim 16, wherein the heat tolerant bag comprises a polypropylene bag.

18. The apparatus of claim 10, wherein the gaseous exchange portal further comprises a microbial filter.

19. The apparatus of claim 10, wherein the gaseous exchange portal comprises a biological filtered vent.

20. The apparatus of claim 10, wherein the nutrient mixture comprises cereal grain.

21. A method to improve plant growth, comprising:
    selecting a pure strain of *Trametes versicolor* (Turkey Tail);
    culturing a spawn culture from the pure strain;
    mixing water and nutrient additives to create a water and nutrient mixture;

sterilizing the water and nutrient mixture;
combining the spawn culture with the water and nutrient mixture in a sterile vessel to form a combination;
incubating the combination in the sterile vessel;
placing a blend of cellulose-based substrate in a container with at least one opening and at least one gaseous interchange portal;
sterilizing the blend of cellulose-based substrate in the container;
cooling the container of the blend of cellulose-based substrate in a HEPA chamber;
transferring the combination from the sterile vessel to the container;
forming a mycelial mass by mixing the combination with the blend of cellulose-based substrate in the container;
sealing the opening of the container; and
offering the container for placement above an elevation of the plants in an indoor growing environment;
wherein the mycelial mass produces carbon dioxide, which is released from the container to affect non-electrical transfer of the carbon dioxide, improving the plant growth.

22. The method of claim 21, further comprising incubating the mycelial mass mixture in the container for a period of time.

23. The method of claim 21, wherein the at least one gaseous interchange portal further comprises a microbial filter.

24. The method of claim 21, wherein the at least one gaseous interchange portal is a biological filtered vent.

25. The method of claim 21, wherein the blend of cellulose-based substrate comprises recycled sawdust.

26. The method of claim 21, wherein sterilizing is conducted using a combination of heat and pressure.

27. The method of claim 21, wherein the nutrient additives comprise cereal grain.

28. The method of claim 21, wherein the container comprises a polypropylene bag.

29. The method of claim 21, wherein the container comprises a heat tolerant bag.

30. A method to improve plant growth, comprising:
selecting a pure fungal strain;
culturing a spawn culture from the pure fungal strain;
mixing water and nutrient additives to create a water and nutrient mixture;
sterilizing the water and nutrient mixture;
combining the spawn culture with the water and nutrient mixture in a sterile vessel to form a combination;
incubating the combination in the sterile vessel;
placing a blend of cellulose-based substrate in a container with at least one opening and at least one gaseous interchange portal;
sterilizing the blend of cellulose-based substrate in the container;
cooling the container of the blend of cellulose-based substrate in a HEPA chamber;
transferring the combination from the sterile vessel to the container;
forming a mycelial mass by mixing the combination with the blend of cellulose-based substrate in the container;
sealing the opening of the container; and
offering the container for placement above an elevation of the plants in an indoor growing environment;
wherein the mycelial mass produces carbon dioxide, which is released from the container to affect non-electrical transfer of the carbon dioxide, improving the plant growth.

31. The method of claim 30, wherein the pure fungal strain is a white rot fungus.

32. The method of claim 30, wherein the pure fungal strain is *Trametes versicolor* (Turkey Tail).

* * * * *